US011355055B2

(12) United States Patent
Kim

(10) Patent No.: US 11,355,055 B2
(45) Date of Patent: Jun. 7, 2022

(54) DISPLAY APPARATUS AND CONTROL METHOD THEREOF

(71) Applicant: SAMSUNG ELECTRONICS CO., LTD., Suwon-si (KR)

(72) Inventor: Junggi Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/078,264

(22) Filed: Oct. 23, 2020

(65) Prior Publication Data
US 2021/0125548 A1 Apr. 29, 2021

(30) Foreign Application Priority Data
Oct. 25, 2019 (KR) .......................... 10-2019-0133619

(51) Int. Cl.
*G09G 3/32* (2016.01)
*G06F 3/14* (2006.01)

(52) U.S. Cl.
CPC ............. *G09G 3/32* (2013.01); *G06F 3/1446* (2013.01); *G09G 2300/026* (2013.01); *G09G 2320/029* (2013.01); *G09G 2320/0233* (2013.01); *G09G 2320/048* (2013.01); *G09G 2354/00* (2013.01); *G09G 2360/04* (2013.01)

(58) Field of Classification Search
CPC ......... G09G 3/1446; G09G 3/32–3291; G09G 2320/0233; G09G 2320/029; G09G 2320/048; G09G 2354/00; G09G 2360/04
See application file for complete search history.

(56) References Cited

U.S. PATENT DOCUMENTS

| 2005/0134525 | A1* | 6/2005 | Tanghe | G09G 3/3208 |
| | | | | 345/1.1 |
| 2005/0253777 | A1* | 11/2005 | Zehner | G06F 3/1446 |
| | | | | 345/1.3 |
| 2006/0114172 | A1* | 6/2006 | Shivji | G09G 3/32 |
| | | | | 345/1.1 |
| 2013/0279012 | A1* | 10/2013 | Lee | G02B 3/0043 |
| | | | | 359/622 |
| 2017/0352310 | A1 | 12/2017 | Kim et al. | |
| 2020/0193897 | A1* | 6/2020 | Park | G06F 3/1446 |
| 2020/0225903 | A1* | 7/2020 | Cohen | G06F 3/1446 |

FOREIGN PATENT DOCUMENTS

EP 1 548 573 A1 6/2005
KR 1020170029712 A 3/2017

OTHER PUBLICATIONS

Communication dated Mar. 1, 2021, issued by the European Patent Office in counterpart European Application No. 20203300.7.

\* cited by examiner

*Primary Examiner* — Gene W Lee
(74) *Attorney, Agent, or Firm* — Sughrue Mion, PLLC

(57) ABSTRACT

A display apparatus is provided. The display apparatus includes: display modules arranged to form a screen; and an image processing device configured to output a signal to the display device to control display of an image on the screen. One of the display modules includes: a driver configured to output a driving signal to control LEDs to emit light, a storage configured to store an image-quality set value, and a processor configured to update the image-quality set value based on image-quality characteristic information of a different display module among the plurality of display modules, and control the driver to adjust the driving signal based on the image-quality set value.

17 Claims, 12 Drawing Sheets

DISPLAY APPARATUS AND CONTROL METHOD THEREOF

CROSS-REFERENCE TO RELATED APPLICATION(S)

This application is based on and claims priority under 35 U.S.C. § 119 to Korean Patent Application No. 10-2019-0133619, filed on Oct. 25, 2019, in the Korean Intellectual Property Office, the disclosure of which is incorporated by reference herein in its entirety.

BACKGROUND

Field

The disclosure relates to a display apparatus in which a screen for displaying an image is embodied by a plurality of display modules and a control method thereof, and more particularly to a display apparatus in which some display modules are replaceable among a plurality of display modules for embodying a screen, and a method of controlling the same.

Description of Related Art

To compute and process predetermined information in accordance with certain processes, an electronic apparatus includes a central processing unit (CPU), a chipset, a memory, and other electronic components for the computation. Such an electronic apparatus may be variously classified in accordance with what information will be processed and what it is used for. For example, the electronic apparatus may be classified as an information processing apparatus such as a personal computer (PC), a server or the like for processing general information; an image processing apparatus for processing image data; an audio apparatus for audio process; home appliances for miscellaneous household chores; etc. In particular, the image processing apparatus may be embodied by a display apparatus that displays processed image data as an image on a screen. There are various types of display panels applicable to the display apparatus. A micro light emitting diode (or μLED) display panel is an example of a flat display panel, and includes a plurality of inorganic light emitting diodes (LEDs) less than or equal to 100 micrometers. The micro LED display panel provides improved contrast, response time and energy efficiency in comparison with a liquid crystal display (LCD) panel which needs a backlight unit. The micro LED also provides improved energy efficiency, brightness, light emitting efficiency and life in comparison with an organic LED (OLED) or inorganic LED.

As diverse image-based expressions are required in various fields, a display apparatus has been increasingly applied to more and more fields. For example, a display apparatus with an enlarged screen is needed. To enlarge the screen of the display apparatus, two major requirements need to be fulfilled: one is a high-performance processor capable of displaying an image on the enlarged screen, and the other is a display panel embodied as the enlarged screen. With regard to the latter, if a single display panel is embodied as the enlarged screen, problems may arise in various aspects such as technology, production efficiency, costs, etc.

In this regard, a module-type display apparatus has been proposed in which a display module is manufactured to have a uniform size for modularization so that a plurality of such display modules can be tiled to embody an enlarged screen. By combining display modules in different manners, the module-type display apparatuses may be assembled into a screen having a size and a shape as desired by a user. Therefore, display modules may be combined to form a display apparatus with a screen taking up the whole wall, etc. For example, the display modules may be adaptively installable in a wide variety of spaces, and therefore a scope of application is being gradually extended.

Because the screen of the module-type display apparatus is embodied by a combination of the plurality of display modules, the display modules are freely and partly replaceable. In other words, when a certain display module is defective, it is possible to replace only the defective display module without replacing all the plurality of display modules forming the screen.

Even if the plurality of display modules are manufactured with the same materials and under the same processes, the replaced display module may show different image quality from other surrounding display modules for various reasons such as difference in deterioration, etc. Although an important point of the module-type display apparatus is that a single screen is achieved by the plurality of display modules of which image qualities are in harmony with one another, some replaced display modules may show image qualities disturbing the harmony. For example, a newly replaced display module may be brighter than an adjacent display module that has not been newly replaced.

Accordingly, a method of adjusting the screen to have generally harmonious (i.e., consistent) image quality may be required when some display modules are replaced in the module-type display apparatus.

SUMMARY

In accordance with an aspect of the disclosure, there is provided a display apparatus including: a display device with a plurality of display modules arranged to form a screen; and an image processing device configured to output a signal to the display device to control display of an image on the screen, wherein one of the plurality of display modules includes: a substrate, a plurality of light emitting diodes (LEDs) arranged on the substrate, a driver configured to output a driving signal to control the plurality of LEDs to emit light, a storage configured to store an image-quality set value, and a processor configured to update the image-quality set value based on image-quality characteristic information of a different display module among the plurality of display modules, and control the driver to adjust the driving signal based on the image-quality set value.

The image-quality characteristic information may indicate a usage time of the different display module, and the processor may be further configured to control the driver to adjust the driving signal based on the usage time.

The processor may be further configured to control the driver to adjust an electric current of the driving signal based on the image-quality characteristic information.

The image-quality set value may indicate an adjustment value for the electric current of the driving signal corresponding to image-quality characteristic information of the one of the plurality of display modules, and the processor may be further configured to control the driver to adjust the electric current of the driving signal based on the adjustment value which has been updated based on the image-quality characteristic information.

The processor may be further configured to obtain the image-quality characteristic information of the different display module from the image processing device.

The processor may be further configured to obtain the image-quality characteristic information from the different display module.

The processor may be further configured to obtain the image-quality characteristic information based on a user input.

The display apparatus may further include a communication interface, and the processor may be further configured to obtain the image-quality characteristic information from a server through the communication interface.

Each of the plurality of display modules may be replaceable.

In accordance with an aspect of the disclosure, there is provided a display module configured to be used in a display apparatus with a plurality of replaceable display modules, the display module including: a substrate; a plurality of light emitting diodes (LEDs) arranged on the substrate; a driver configured to output a driving signal for driving the plurality of LEDs to emit light; a storage configured to store an image-quality set value; and a processor configured to update the image-quality set value based on image-quality characteristic information of a different display module among the plurality of replaceable display modules, and control the driver to adjust the driving signal based on the image-quality set value.

In accordance with an aspect of the disclosure, there is provided a method of controlling a display module of a display apparatus that includes a display device with a plurality of display modules arranged to form a screen, and an image processing device configured to output a signal to the display device to control display of an image on the screen, the method including: storing an image-quality set value for driving a plurality of light emitting diodes (LEDs) arranged on a substrate of the display module; obtaining image-quality characteristic information of a different display module among the plurality of display modules; updating the stored image-quality set value based on the obtained image-quality characteristic information; adjusting a driving signal for driving the plurality of LEDs to emit light based on the updated image-quality set value; and controlling the plurality of LEDs based on the adjusted driving signal.

The image-quality characteristic information may indicate a usage time of the different display module, and the method may further include adjusting the driving signal based on the usage time.

The method may further include adjusting an electric current of the driving signal based on the obtained image-quality characteristic information.

The stored image-quality set value may indicate an adjustment value for the electric current of the driving signal corresponding to image quality characteristics of the display module, and the method may further include adjusting the electric current of the driving signal based on the adjustment value which has been updated based on the image-quality characteristic information.

The method may further include obtaining the image-quality characteristic information of the different display module from the image processing device.

The method may further include obtaining the image-quality characteristic information from the different display module.

The may further include obtaining the image-quality characteristic information based on a user input.

The method may further include obtaining the image-quality characteristic information from a server communicating with the display apparatus.

Each of the plurality of display modules may be replaceable.

In accordance with an aspect of the disclosure, there is provided a display module configured to be used in a display apparatus with a plurality of display modules, the display module including: a driver configured to output a driving signal for driving a plurality of light emitting diodes (LEDs); a storage configured to store an image-quality set value and identification information of a previously connected display apparatus; and a processor configured to: compare identification information of the display apparatus with the identification information of the previously connected display apparatus; obtain image-quality characteristic information of the display apparatus based on the identification information of the display apparatus not corresponding to the identification information of the previously connected display apparatus; and control the driver to output the driving signal for driving the plurality of LEDs based on the image-quality characteristic information.

The processor may be further configured to request the image-quality characteristic information of the display apparatus from the display apparatus based on the identification information of the display apparatus not corresponding to the identification information of the previously connected display apparatus.

The processor may be further configured to control the driver to output the driving signal for driving the plurality of LEDs based on previously stored image-quality characteristic information based on the identification information of the display apparatus corresponding to the identification information of the previously connected display apparatus.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Below, embodiments will be described in detail with reference to accompanying drawings. Embodiments described with reference to each drawing are not mutually exclusive configurations unless otherwise specified, and a plurality of embodiments may be selectively combined and implemented in one apparatus. The combination of the plurality of embodiments may be arbitrarily selected and applied by a person skilled in the art in implementing the spirit of the present disclosure.

As used herein, terms the terms "1st" or "first" and "second" or "2nd" may use corresponding components regardless of importance or order and are used to distinguish one component from another without limiting the components. For example, a "first" component may be named a "second" component and the "second" component may also be similarly named the "first" component, without departing from the scope of the disclosure.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
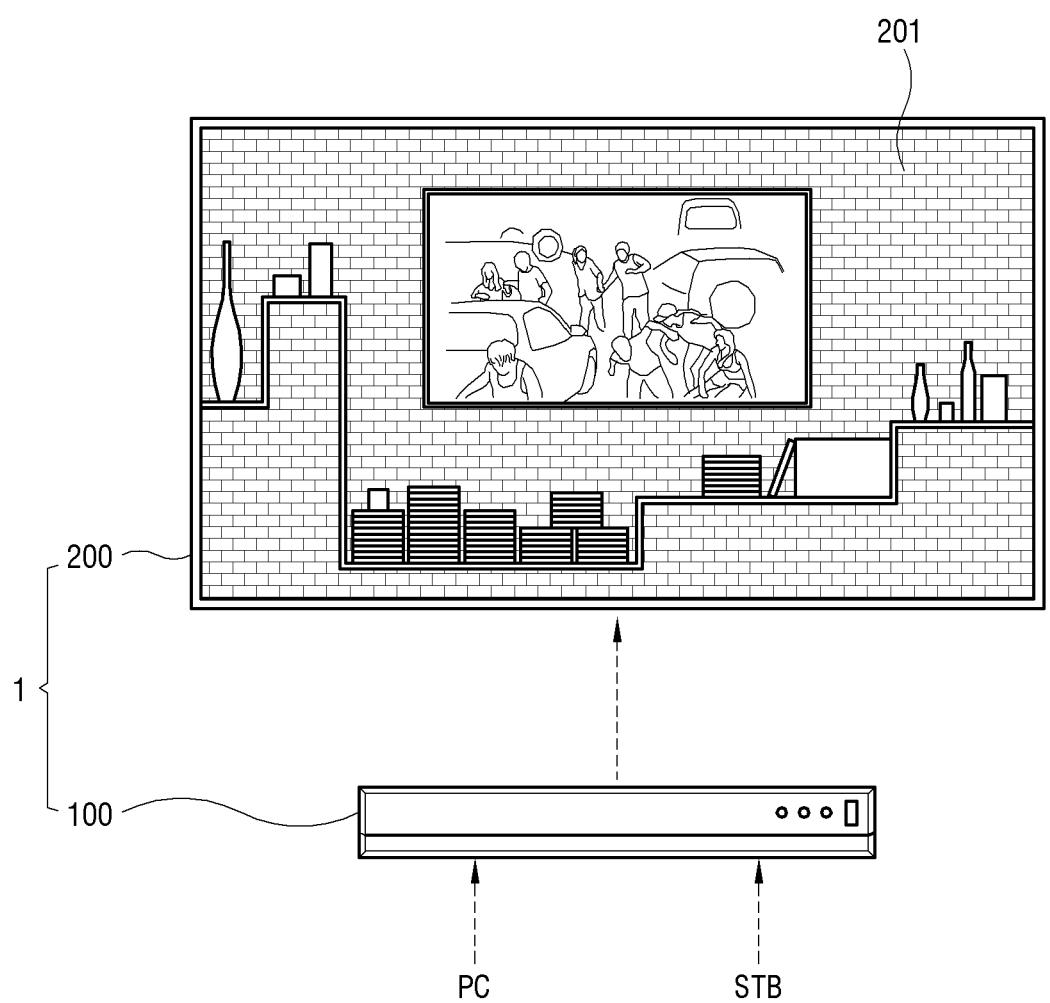
FIG. 1 illustrates a display apparatus according to an embodiment.

FIG. 1 illustrates a display apparatus according to an embodiment.

As shown in FIG. 1, a display apparatus 1 according to an embodiment includes a screen 201 displaying an image based on a processed image signal, and may for example be embodied as a television (TV). Although the TV is illustrated, embodiments are not limited thereto and the display apparatus 1 may be embodied by various kinds of apparatuses, such as a digital signage, an electronic frame, a video wall, a digital whiteboard, etc.

The display apparatus 1 includes a main body or image processing device 100 that processes an image signal based on image content received from the outside or stored in itself, and a display device 200 that displays an image based on the image signal output from the image processing device 100. For example, the image processing device 100 may be provided in a media box separated from the display device 200. However, embodiments are not limited thereto and the display apparatus 1 may include the image processing device 100, and the display device 200 and the image processing device 100 may be coupled to one frame or accommodated in one housing.

The image processing device 100 receives an image signal through various transfer methods such as local area network (LAN) communication with a personal computer (PC), a set-top box, and the like external apparatuses; wide area network (WAN) communication with a server; a radio frequency (RF) for receiving a broadcast signal; etc. Alternatively, the image processing device 100 may obtain an image signal by reading image content data stored in an internal storage. The image processing device 100 performs decoding, scaling, and the like image-related process with regard to the obtained image signal, thereby outputting the processed image signal to the display device 200. The image processing device 100 and the display device 200 may communicate using wired and/or wireless methods.

The display device 200 forms a screen 201 for displaying an image based on an image signal received from the image processing device 100. The display device 200 includes a display panel, and various design methods may be applicable to the structure of the display panel. The display device 200 according to this embodiment is structured to form a large screen 201 with a plurality of display panels (i.e., a plurality of display modules) having a µLED, an OLED or other self-emissive structure.

Below, the structure of the display device 200 will be described.

Figure 2:
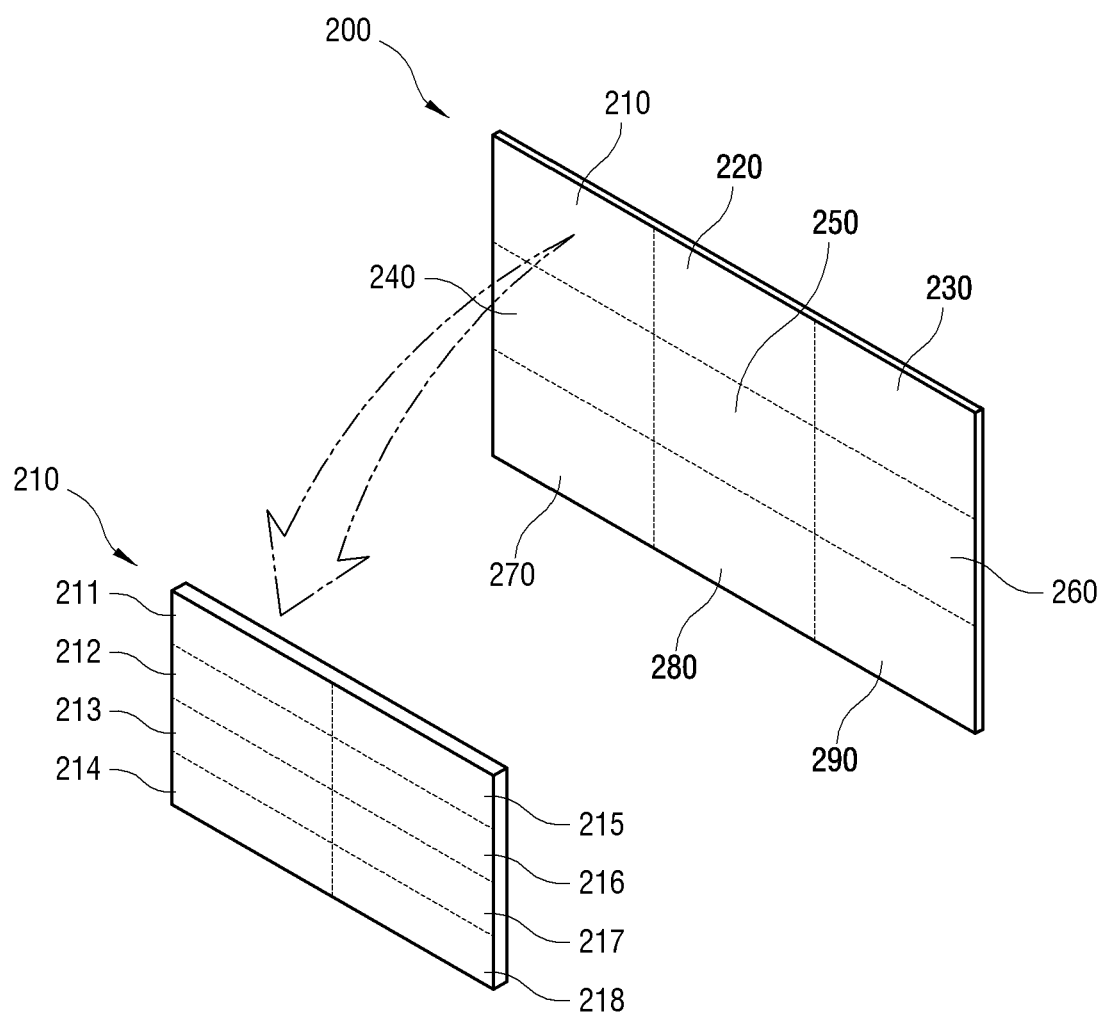
FIG. 2 illustrates a structure in which a screen is formed by a plurality of display modules according to an embodiment.

FIG. 2 illustrates a structure in which a screen formed by a plurality of display modules according to an embodiment.

As shown in FIG. 2, a display apparatus includes a display device 200 which may be embodied as a large format display (LFD) installable on a substantially vertical installation-surface such as a wall, etc. The display device 200 includes a plurality of display modules 210, 220, 230, 240, 250, 260, 270, 280 and 290. The plurality of display modules 210, 220, 230, 240, 250, 260, 270, 280 and 290 are arranged side by side in rows and columns in the form of a matrix, so that the display device 200 can form a single large screen. Although the illustrated display device 200 includes nine display modules 210, 220, 230, 240, 250, 260, 270, 280 and 290 arranged in the form of 3×3, this is one possible example, and there are no limits to the number, arrangement, quantity, form, etc. of the display modules 210, 220, 230, 240, 250, 260, 270, 280 and 290.

Each of the display modules 210, 220, 230, 240, 250, 260, 270, 280 and 290 is individually separable, and includes a plurality of displays 211, 212, 213, 214, 215, 216, 217 and 218 which are grouped to form a sub screen. However, the display modules 210, 220, 230, 240, 250, 260, 270, 280 and 290 are not limited to such a structure that the display modules 210, 220, 230, 240, 250, 260, 270, 280 and 290 include the plurality of displays 211, 212, 213, 214, 215, 216, 217 and 218. Alternatively, one display module 210, 220, 230, 240, 250, 260, 270, 280 or 290 may be designed to include a single display 211, 212, 213, 214, 215, 216, 217 or 218.

The plurality of displays 211, 212, 213, 214, 215, 216, 217 and 218 are arranged parallel in rows and columns in the form of a matrix, thereby forming one display module 210, 220, 230, 240, 250, 260, 270, 280 or 290. In this embodiment, one display module 210, 220, 230, 240, 250, 260, 270, 280 or 290 includes eight displays 211, 212, 213, 214, 215, 216, 217 and 218 arranged in the form of 4×2. However, this is one possible example, and a different number, arrangement, form, etc. of displays 211, 212, 213, 214, 215, 216, 217 and 218 may be used to form a display module. Further, although the plurality of displays 211, 212, 213, 214, 215, 216, 217 and 218 are only illustrated with respect to one display module 210, the other display modules 220, 230, 240, 250, 260, 270, 280 and 290 are also structured to each include a plurality of displays.

The display device 200 includes a frame provided to support the plurality of display modules 210, 220, 230, 240, 250, 260, 270, 280 and 290 and form a screen. The display device 200 is embodied by a tile display, in which the plurality of display modules 210, 220, 230, 240, 250, 260, 270, 280 and 290 are tiled and supported in the frame in a state that the frame is mounted to a predetermined installation surface such as a wall, etc.

Each of the display modules 210, 220, 230, 240, 250, 260, 270, 280 and 290 includes a plurality of inorganic light emitting diodes mounted to a quadrangular substrate, and a driver for driving each light emitting diode. The light emitting diodes are arranged parallel in rows and columns in the form of a matrix on the substrate. Below, the displays 211, 212, 213, 214, 215, 216, 217 and 218 included in each of the display modules 210, 220, 230, 240, 250, 260, 270, 280 and 290 will be described.

Figure 3:
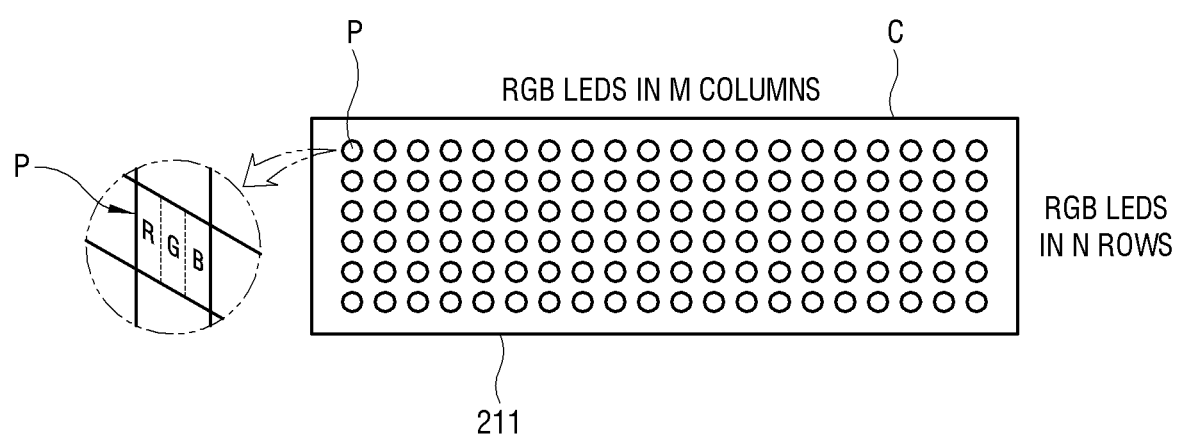
FIG. 3 illustrates a display area of a display module according to an embodiment.

FIG. 3 illustrates a display area of a display module.

As shown in FIG. 3, one display 211 of the display module includes a plurality of pixels P arranged in a matrix form of M×N (where, M and N are natural numbers) on a substrate C. Each pixel P includes a plurality of light emitting elements respectively corresponding to sub pixels of red, green and blue (RGB) colors. Each light emitting element includes an inorganic light emitting element such as an LED, and is provided to emit light corresponding to one of three RGB colors. In this embodiment, the light emitting elements in the pixel P are provided as microscopic LEDs, i.e., a micro LED in units of micrometer (μm). Further, the display 211 includes a driver to drive each light emitting element by applying voltage to each light emitting element.

One pixel P includes three light emitting elements that individually emit light of three RGB colors. A color of light, which is represented in one pixel P, is varied depending on a mixture of light emitted from the light emitting elements corresponding to three colors included in the corresponding pixel P. Each pixel P of the display 211 receives a control signal, current or voltage corresponding to various brightness levels and colors, and thus the light emitting elements are individually driven based on the received control signal, current or voltage, thereby allowing the pixel P to emit light having a specific brightness level and color.

However, the number and colors of the light emitting elements included per pixel P of the display 211 are not limited to this embodiment. For example, the display 211 may be provided to display a monotone image, and each pixel may only include light emitting elements of a single color. Alternatively, two or more light emitting elements may correspond to each of the RGB colors in the pixel P. Alternatively, each pixel may include an additional light emitting element, such as cyan, so that each pixel includes four or more light emitting elements.

Below, the configuration of the display apparatus will be described.

Figure 4:
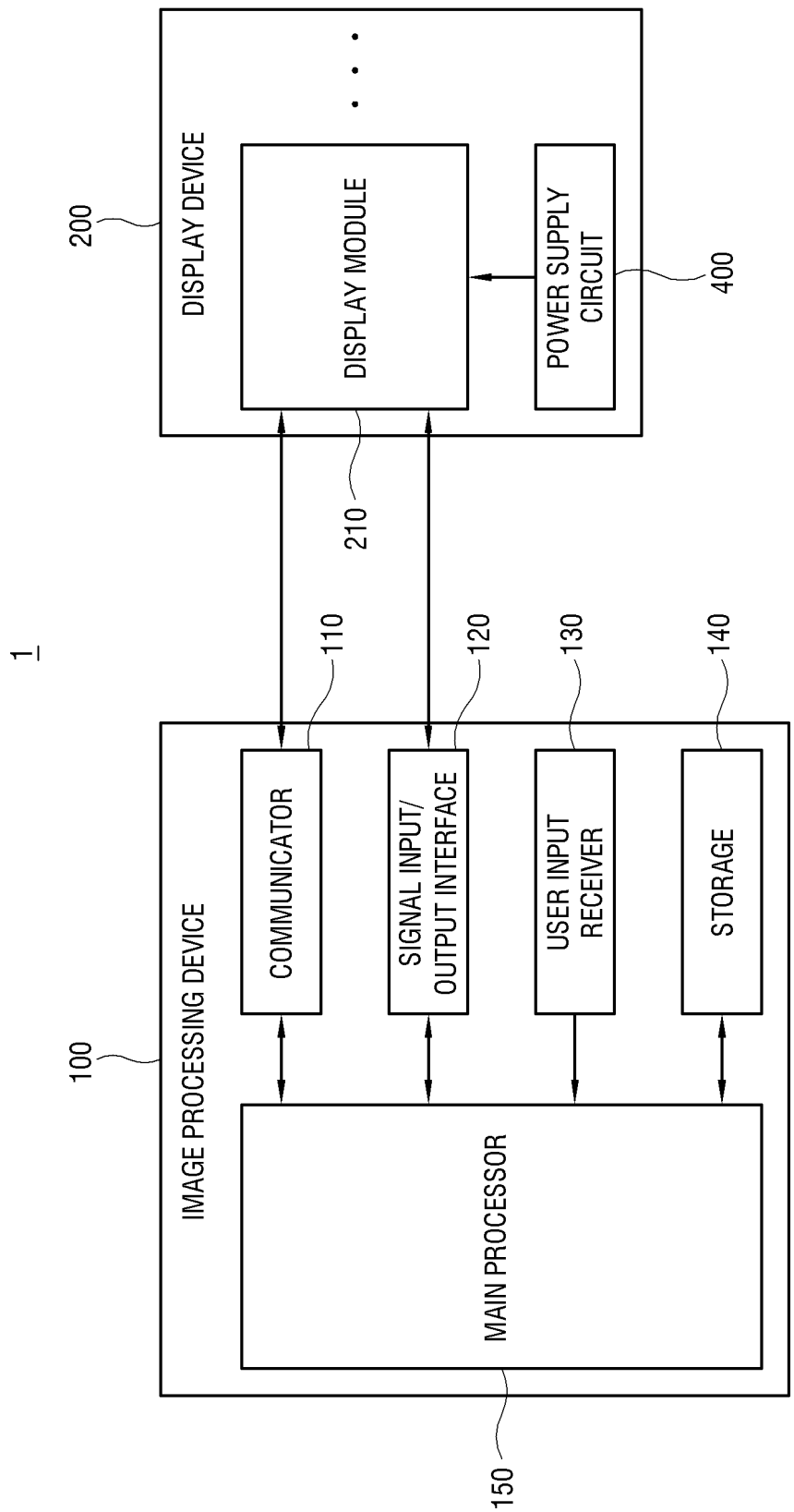
FIG. 4 is a block diagram of a display apparatus according to an embodiment.

FIG. 4 is a block diagram of a display apparatus according to an embodiment.

As shown in FIG. 4, the display apparatus 1 includes the image processing device 100 and the display device 200. The image processing device 100 includes a communicator 110, a signal input/output interface 120, a user input receiver 130, a storage 140, and a main processor 150. The display device 200 includes a plurality of display modules 210, 220, 230, 240, 250, 260, 270, 280 and 290, and a power supply circuit 400.

The communicator 110 refers to an interactive communication circuit that includes at least one of elements, such as a communication module, a communication chip, etc. corresponding to various wired and wireless communication protocols. The communicator 110 may include a transceiver (transmitter and receiver). The communicator 110 supports one or more wired or wireless communication standards, and includes a communication circuit, a communication chip or a communication module to perform communication based on the wireless communication standards. For example, the communicator 110 includes a communication circuit for one-to-one local area communication such as Bluetooth, Bluetooth low energy (BLE), etc., or other communication method complying with Institute of Electrical and Electronics Engineers (IEEE) 802.15 standards. Further, the communicator 110 includes a communication circuit for wide area network (WAN)-based communication such as Wi-Fi, etc. or wireless local area network (LAN) communication complying with IEEE 802.11. Thus, the communicator 110 can communicate with the display device 200, various external apparatuses and servers.

The signal input/output interface 120 is connected to an external apparatus such as a set-top box or an optical media player by one-to-one or one-to-many wired connection, thereby receiving data from or outputting data to the external apparatus. The signal input/output interface 120 may for example include a connector, a port, etc. based on preset transfer protocols, such as a high definition multimedia interfaced (HDMI) port, DisplayPort, a universal serial bus (USB) port, etc.

The communicator 110 and the signal input/output interface 120 allows the display apparatus 1 to communicate with the external apparatus, and connects the image processing device 100 and the display device 200 so that an image signal output from the image processing device 100 can be transmitted to the display device 200. For example, the image signal may be wirelessly transmitted from the image processing device 100 to the display device 200 through a Wi-Fi communication module of the communicator 110. Alternatively, the image signal may be transmitted from the image processing device 100 to the display device 200 through a cable connected to an HDMI port of the signal input/output interface 120. To this end, the display device 200 may additionally include a communication module or port to receive a signal from the communicator 110 or the signal input/output interface 120.

The user input receiver 130 includes circuits related to various input interfaces provided to be controlled by a user to thereby receive an input of a user. The user input receiver 130 may be variously configured according to the kinds of display apparatus 1, and may for example include a mechanical or electronic button installed in a housing of an image processing device 100 or a display device 200, a remote controller separated from the image processing device 100, a touch pad, a touch screen installed in the display device 200, etc.

The storage 140 is configured to store various pieces of data. The storage 140 includes a nonvolatile storage and a volatile memory. The nonvolatile storage may be a medium in which recorded data is retained even though power is not supplied, and includes a flash memory, a hard disc drive (HDD), a solid-state drive (SSD), a read only memory (ROM), etc. The volatile memory may be a medium in which recorded data is not retained while power is not supplied, and includes a buffer, a random-access memory (RAM), etc.

The main processor 150 includes one or more hardware processors achieved by a central processing unit (CPU), a chipset, a buffer, a circuit, etc. which are mounted on a printed circuit board (PCB). Alternatively, the processor 217 may be designed as a system on chip (SoC). The main processor 150 includes modules corresponding to various processes, such as a demultiplexer, a decoder, a scaler, an audio digital signal processor (DSP), an amplifier, etc. to process an image. Among such modules, some or all of the modules may be achieved by the SoC. For example, a demultiplexer, a decoder, a scaler, and the like module related to an image process may be achieved as an image processing SoC, and an audio DSP may be achieved as a chipset separated from the SoC.

The main processor 150 outputs the processed image signal to each display module 210 of the display device 200 so that each display module 210 can display an image given in units of an area, thereby finally displaying the entire image on the screen of the display device 200. In this case, the main processor 150 may independently control the image attributes of the image signal output according to the display modules 210 so that the display device 200 can naturally display the entire image with harmonious image quality. Alternatively, the main processor 150 may not independently control the image characteristics of the image signal output according to the display modules 210, 220, 230, 240, 250, 260, 270, 280 and 290, but the display modules 210, 220, 230, 240, 250, 260, 270, 280 and 290 may individually control the image characteristics of the image signal received from the image processing device 100.

The display device 200 includes a power supply circuit 400 for supplying electric power to the plurality of display modules 210, 220, 230, 240, 250, 260, 270, 280 and 290 in the display device 200, separately from the power supply circuit of the image processing device 100. The power supply circuit 400 converts alternating current (AC) power supplied from the outside into a direct current (DC) power having an adaptive level, thereby individually supplying the DC power to the display modules 210, 220, 230, 240, 250, 260, 270, 280 and 290. To this end, the power supply circuit 400 may be provided by combination of various kinds of electronic parts needed for controlling power, such as a capacitor, a switch, etc. on a substrate. One or at least two power supply circuits 400 may be provided, and may be placed inside the display module 210.

Like the foregoing embodiment, the plurality of display modules 210, 220, 230, 240, 250, 260, 270, 280 and 290 are provided to thereby form the screen of the display device 200 on which an image is displayed. Below, the configuration of the display module 210 will be described in detail.

Figure 5:
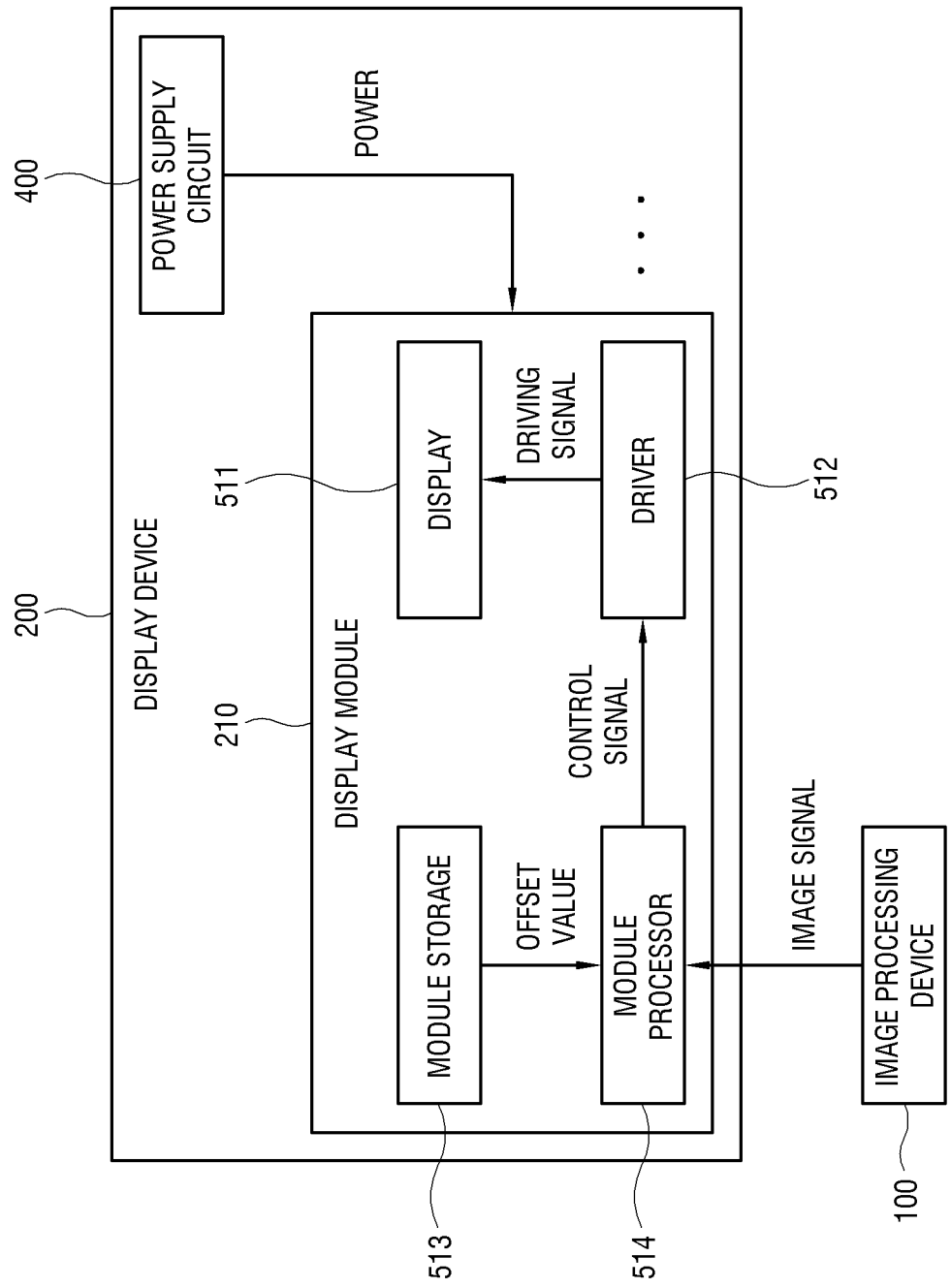
FIG. 5 is a block diagram of a display module forming a display according to an embodiment.

FIG. 5 is a block diagram of a display module forming a display device.

As shown in FIG. 5, the display device 200 includes the plurality of display modules 210, 220, 230, 240, 250, 260, 270, 280 and 290, and the power supply circuit 400 supplying electric power to the plurality of display modules 210, 220, 230, 240, 250, 260, 270, 280 and 290. Each display module 210 includes a display 511, a driver 512, a module storage 513, and a module processor 514. The plurality of display modules 210, 220, 230, 240, 250, 260, 270, 280 and 290 included in the display device 200 have substantially the same structure, and therefore only one of the display modules 210, 220, 230, 240, 250, 260, 270, 280 and 290 will be representatively described in this embodiment.

One or more displays 511 are provided with regard to each of the plurality of pixels in the display module 210. To emit light of various colors, each pixel in the display 511 may for example include three light emitting elements respectively corresponding to the RGB colors. The light emitting element is embodied by the LED that emits light based on applied voltage.

The driver 512 drives the plurality of light emitting elements included in the display 511. The driver 512 is provided in units of display module 210. When two or more of the plurality of display modules 210, 220, 230, 240, 250, 260, 270, 280 and 290 are present, the driver 512 is provided corresponding to each of the two or more of the plurality of display modules 210, 220, 230, 240, 250, 260, 270, 280 and 290. The driver 512 may employ various hardware designs, and may for example include a hardware circuit including wiring lines, electrodes, switches, etc. on the substrate.

The driver 512 selectively controls voltage or current applied to the light emitting elements for RGB colors in each pixel of the display 511 according to a control signal output from the module processor 514, thereby individually controlling the brightness of the light emitting elements. The driver 512 individually drives the light emitting elements of all the pixels in the display 511 to ultimately display an image corresponding to an area, which is assigned to the corresponding display module 210, of the entire image. The driver 512 uses a driving signal such as a pulse width modulation (PWM) signal, a pulse frequency modulation (PFM) signal, or the like to control the voltage or current applied to the light emitting element. The driver 512 may for example adjust a duty ratio of a PWM signal to thereby control the voltage or current applied to the light emitting element.

The module storage 513 is a storage provided in the display module 210, different from the storage of the image processing device 100. The module storage 513 may for example be configured to store predetermined information to be referred to by the module processor 514 when controlled by the driver 512.

The module processor 514 is embodied by a hardware control chipset such as a microcontroller, etc. The module processor 514 controls the driver 512 based on the image signal output from the image processing device 100. For example, the module processor 514 receives area information for identifying an area, assigned to the display module 210, of the entire image, together with the image signal for displaying the entire image from the image processing device 100. The module processor 514 identifies an area, to be displayed on the display 511, of the entire image based on the received area information, and controls the driver 512 to display an image corresponding to the identified area on the display 511. When the display module 210 includes the plurality of displays 511, the module processor 514 controls the driver 512 to display an image corresponding to an assigned area on each display 511.

Further, the module processor 514 may obtain image-quality characteristic information about image quality characteristics of an image (for example, the brightness, color distribution, contrast, saturation, gamma value, etc. of the image) in an area assigned to the display 511. For example, the image-quality characteristic information may indicate any one or any combination of a correction value, an adjustment value or an offset value. The image-quality characteristic information may for example be stored in the module storage 513. That is, the module processor 514 adjusts one or more among the image-quality characteristics of the image to be displayed based on the image-quality characteristic information obtained from the module storage 513, in terms of generating the control signal for controlling the driver 512 based on the image signal output from the image processing device 100. Thus, the driving signal output from the driver 512 to the display 511 is adjusted, and the image finally displayed on the display 511 reflects the adjusted image-quality characteristics.

In the display apparatus with the foregoing structure, some among the plurality of display modules 210, 220, 230, 240, 250, 260, 270, 280 and 290 may be replaced. In such a case, the operations of the display apparatus will be described below.

Figure 6:
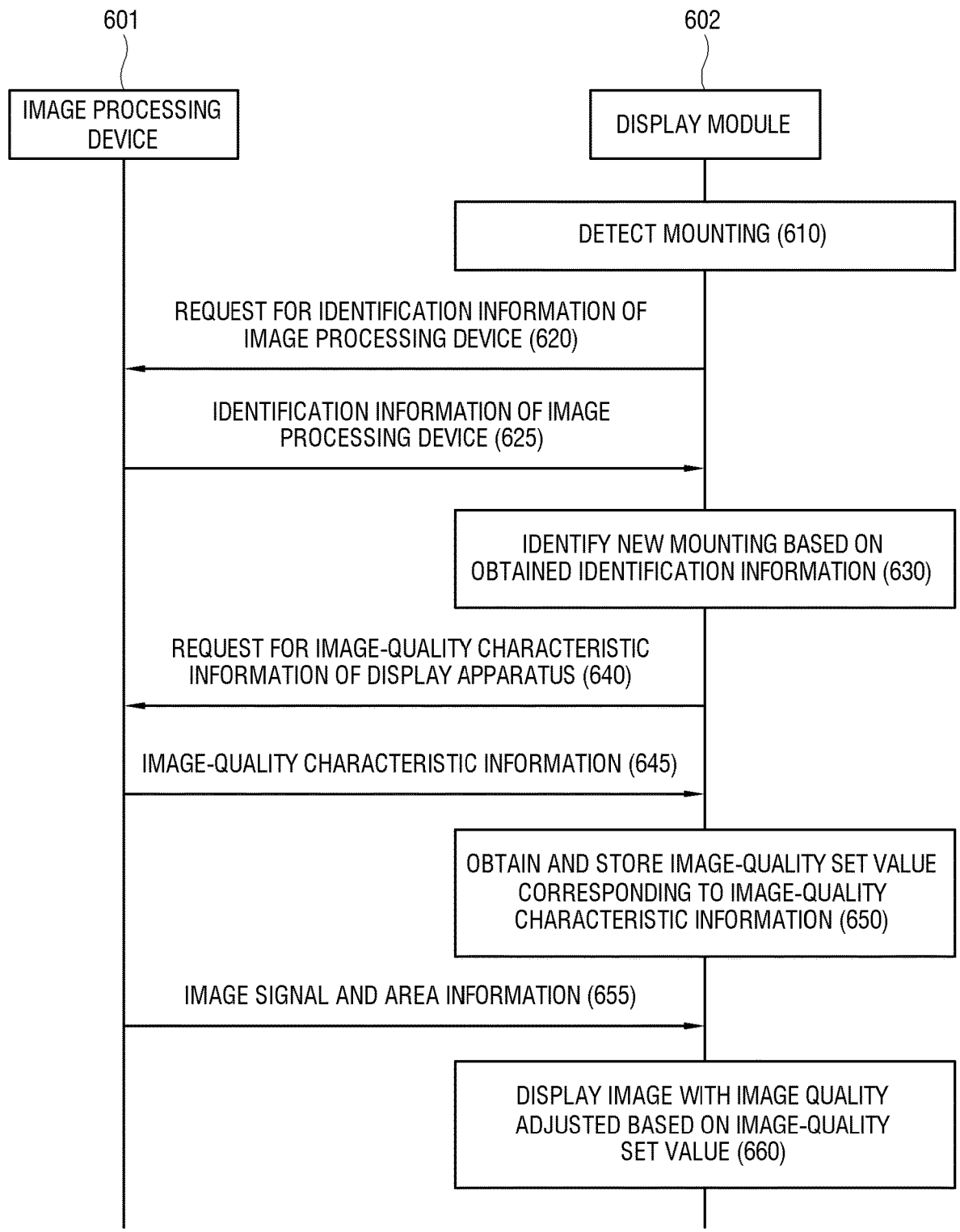
FIG. 6 illustrates operations of when a display module is mounted to a display apparatus according to an embodiment.

FIG. 6 illustrates operations performed when a display module is mounted to a display apparatus according to an embodiment.

FIG. 6 illustrates an operation of newly mounting a display module 602 to a display apparatus including an image processing device 601. The following operations are performed by a module processor of the newly mounted display module 602 among the plurality of display modules included in the display apparatus, or a main processor of the image processing device 601 included in the display apparatus.

At operation 610 the display module 602 detects whether the display module 602 is mounted to the display apparatus.

At operation 620, the display module 602 requests the identification information of the image processing device 601 to the image processing device 601 when it is detected that the display module 602 is mounted to the display apparatus.

At operation 625 the image processing device 601 transmits the identification information of the image processing device 601 to the display module 602 in response to the request of the display module 602. The identification information of the image processing device 601 may be obtained when the display module 602 transmits the request to the image processing device 601, or may be transmitted to the display module 602 by the image processing device 601 without the request from the display module 602 when it is detected that the display module 602 is mounted.

At operation 630 the display module 602 identifies whether the display module 602 is newly mounted to the display apparatus, based on the obtained identification information of the image processing device 601. For example, the display module 602 may identify whether the display module 602 is newly mounted by comparing the obtained identification information of the image processing device 601 with previously stored identification information. For example, the display module 602 may identify that the display module 602 is newly mounted to the display apparatus when the obtained identification information of the image processing device 601 is new, and identify that the display module 602 is not newly mounted to the display apparatus when the obtained identification information of the image processing device 601 matches the previously stored identification information of the image processing device (that is, previously mounted and used display apparatus). The display module 602 may identify that the obtained identification information of the image processing device 601 is new when the obtained identification information of the image processing device 601 does not match the previously stored identification information of the image processing device, or when the identification information of the image processing device 601 is newly obtained in the state that any identification information of the image processing device is not being stored.

As described, the display module 602 identifies whether the display module 602 is mounted or not. However, embodiments are not limited thereto, and according to another embodiment, the image processing device 601 may identify whether the display module 602 is newly mounted or not. In this case, like the operations 610 to 630, the image processing device 601 may identify whether the display module 602 is newly mounted or not based on the identification information of the display module 602 when it is detected that the display module 602 is mounted.

At operation 640 the display module 602 requests for the image-quality characteristic information of the display apparatus from the image processing device 601. The image-quality characteristic information of the display apparatus includes various pieces of information related to the image quality characteristics of the image displayed on the screen of the display apparatus, for example, information about usage time of the display apparatus. However, the image-quality characteristic information of the disclosure is not limited to this example, but may include information about various characteristics having an effect on the image quality characteristics of the image. Here, in detail, the image-quality characteristic information of the display apparatus includes the image-quality characteristic information about the display modules that have already been used except the display module 602 that is newly mounted, among the plurality of display modules included in the display device of the display apparatus.

At operation 645 the image processing device 601 transmits the image-quality characteristic information of the display apparatus to the display module 602 in response to the request of the display module 602.

At operation 650 the display module 602 obtains an image-quality set value corresponding to the image-quality characteristic information of the display apparatus, and stores the obtained image-quality set value. Alternatively, when a predetermined image-quality set value has already been stored, the display module 602 updates or adjusts the previously stored image-quality set value based on the obtained image-quality characteristic information.

At operation 655 the image processing device 601 outputs an image signal and area information to the display module 602. The area information refers to information for identifying an area assigned to the display module 602 within the entire image based on the image signal. For example, each display module of the display apparatus may be assigned to different area, and thereby operate based on different area information.

At operation 660 the display module 602 displays an image based on the image signal and the area information from the image processing device 601, and adjusts the image quality of the image based on the previously stored image-quality set value.

Thus, the display apparatus according to this embodiment displays the entire image on the screen with uniform image quality even though the display module 602 is a replacement display module.

The display module 602 in this embodiment obtains necessary information from the image processing device 601. However, embodiments are not limited thereto, and the information may be obtained from a separate server or the other display modules.

As time passes after initial installation, one or more of the plurality of display modules fail or become defective. The one or more display modules that have failed or become defective may be replaced. In this case, difference in image quality between an image displayed on the replacement display module and images displayed on the original display modules may be recognizable by a user. For example, the replacement display module may appear brighter than the original display modules.

According to this embodiment, the display apparatus may remove such difference or minimize the difference to such an extent as not to be recognizable by a user, thereby providing uniform image quality. For example, the replacement display module may compensate for the difference by displaying images at a lower brightness level.

Further, in this embodiment, such operations are direction performed by the replaced display module and not by the image processing device. However, embodiments are not limited thereto, and the foregoing operations may be performed by the image processing device. As another example, the replacement display module may perform the operations when included in an image processing device that does not perform the foregoing operations. In this case, the replaced display module can directly reflect the image-quality characteristic information of the display apparatus in the image signal without much assistance of the image processing device. Therefore, this embodiment provides improved use environments as compared with those of when the image processing device works.

Below, it will be described by way of example that the display device is initially configured with the plurality of display modules.

Figure 7:
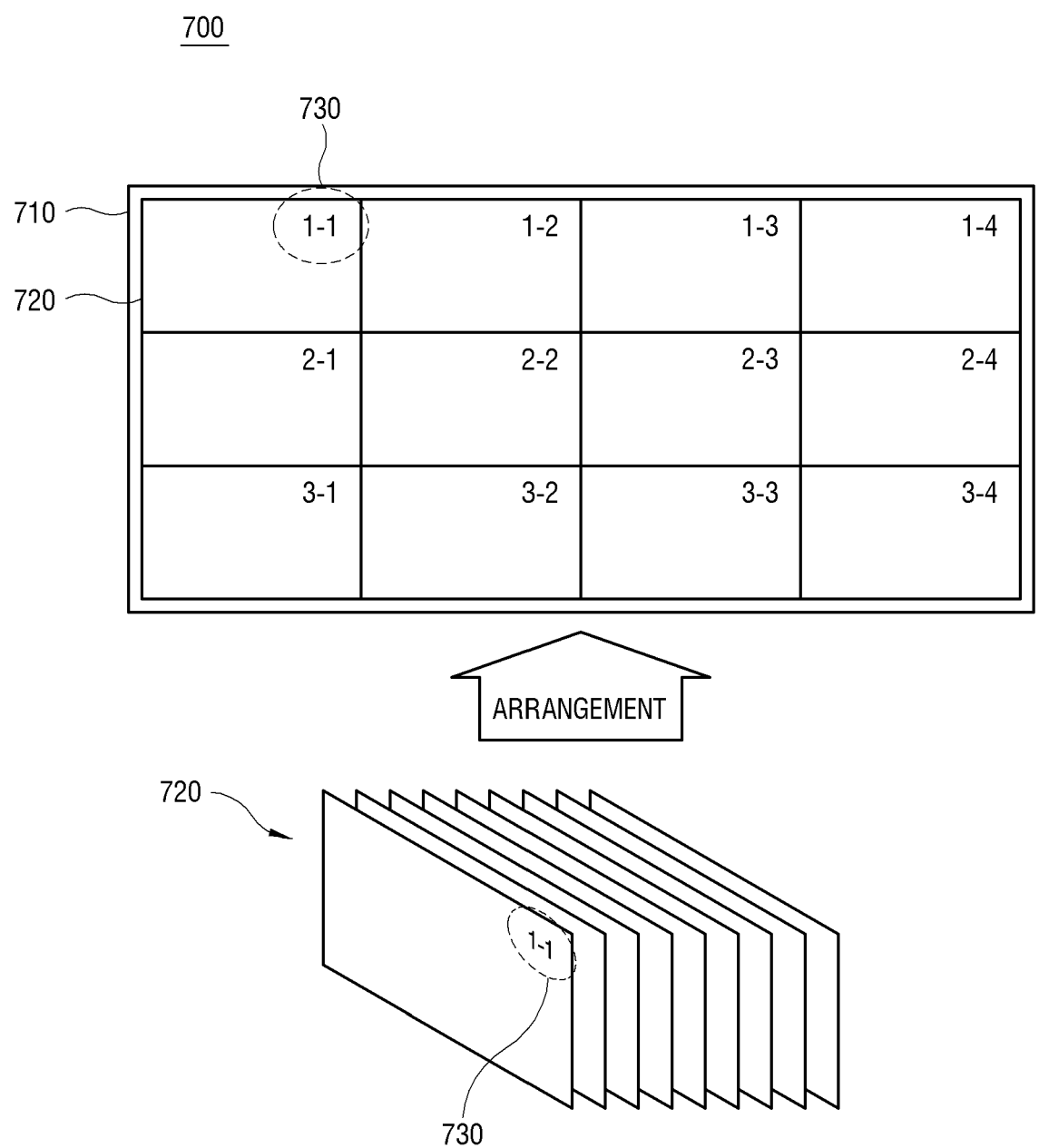
FIG. 7 illustrates that a plurality of display modules are combined into a display device according to an embodiment.

FIG. 7 illustrates that a plurality of display modules are combined into a display device.

As shown in FIG. 7, for example, twelve display modules 720 may be arranged in the form of 3×4 on a frame 710 and combined into a screen of a display device 700. Here, when brightness, color distribution, contrast, saturation, a gamma value and the like image quality characteristics are uniformly shown throughout the screen formed by the plurality of display modules 720, the plurality of display modules 720 may be variously arranged in the frame 710.

However, in practice, there may be various differences in materials, process (production line, production time, etc.), etc. among the plurality of display modules 720 even though the plurality of display modules 720 are produced by one manufacturer. Due to such differences, the screen formed by all the display modules 720 may not provide visually uniform image quality characteristics.

Therefore, the image quality characteristics of the plurality of display modules 720 are previously controlled in a manufacturing stage while one screen is formed by combination of the plurality of display modules 720, so that the whole screen can show uniform image quality, i.e., the entire image can be harmoniously displayed. In this case, image-quality set values, in which the previously controlled image-quality characteristics of the display modules 720 are reflected, are drawn according to the display modules 720. The drawn image-quality set values are stored in the module storage 513 (see FIG. 5) of the corresponding display modules 720, and then reflected in the image quality characteristics of the images displayed on the display modules 720 in the future. For example, regarding the brightness among the image quality characteristics, the image-quality set value may indicate an electric current quantity to be applied to the light emitting element for emitting light.

As discussed above, an image-quality set value may be set for a display module as a part of manufacturing the display device. However, embodiments are not limited to a single image-quality set value, and an additional image-quality set value may be set for the display module. For convenience, the image-quality set value discussed below will be referred to as a first image-quality set value, and the image-quality set value discussed above with reference to FIG. 6 will be referred to as a second image-quality set value.

The module storage 513 (see FIG. 5) of the display modules 720 is configured to store position information for identifying relative positions of the display modules 720 in the display device 700 according to results of previous image-quality control in the manufacturing stage. The first image-quality set value corresponding to the image quality characteristics of a predetermined display module 720 is prepared for the corresponding display module 720 present at a designated position in the display device 700, and therefore the first image-quality set value is dependent on the relative position of the corresponding display module 720. Therefore, the display modules 720 are designated by the position information so that a user can distinguish between the relative positions of the display modules 720 even in the future.

Thereafter, when the display device 700 is configured by combining the plurality of display modules 720, a user interface (UI) 730 indicating the position information about the display modules 720 is displayed on each of the display modules 720 in response to a predetermined trigger event. Based on the UIs 730 displayed on each display modules 720, a user can identify the relative position of each of the plurality of display modules 720 and arrange the display modules 720 on the frame 710 according to the relative positions designated in the manufacturing stage.

The trigger event for displaying the UI 730 may be any one or any combination of various trigger events. For example, the trigger event may be the display module 720 being powered on, or receiving a preset user input while the display module 720 is on.

There are many methods by which the UI 730 shows the position information, without being limited to a certain method. For example, as shown in FIG. 7 the UI 730 may be in the form of "M-N" (where, M and N are natural numbers), in which "M" indicates a row and "N" indicates a column. For example, when the UI 730 indicates "2-3", the display module 720 on which the corresponding UI 730 is displayed is designated to be positioned in the second row and the third column in the 3×4 arrangement. When the UI 730 indicates "3-1", the display module 720 on which the corresponding UI 730 is displayed is designated to be positioned in the third row and the first column in the 3×4 arrangement.

Even when the plurality of display modules 720 are separated from the frame 710 and assembled again for a move or the like reasons, the display modules 720 can be arranged at the same positions as previously based on the UIs 730 respectively displayed on the display modules 720.

Below, it will be described that the display module 720 is replaced in the display device 700.

Figure 8:
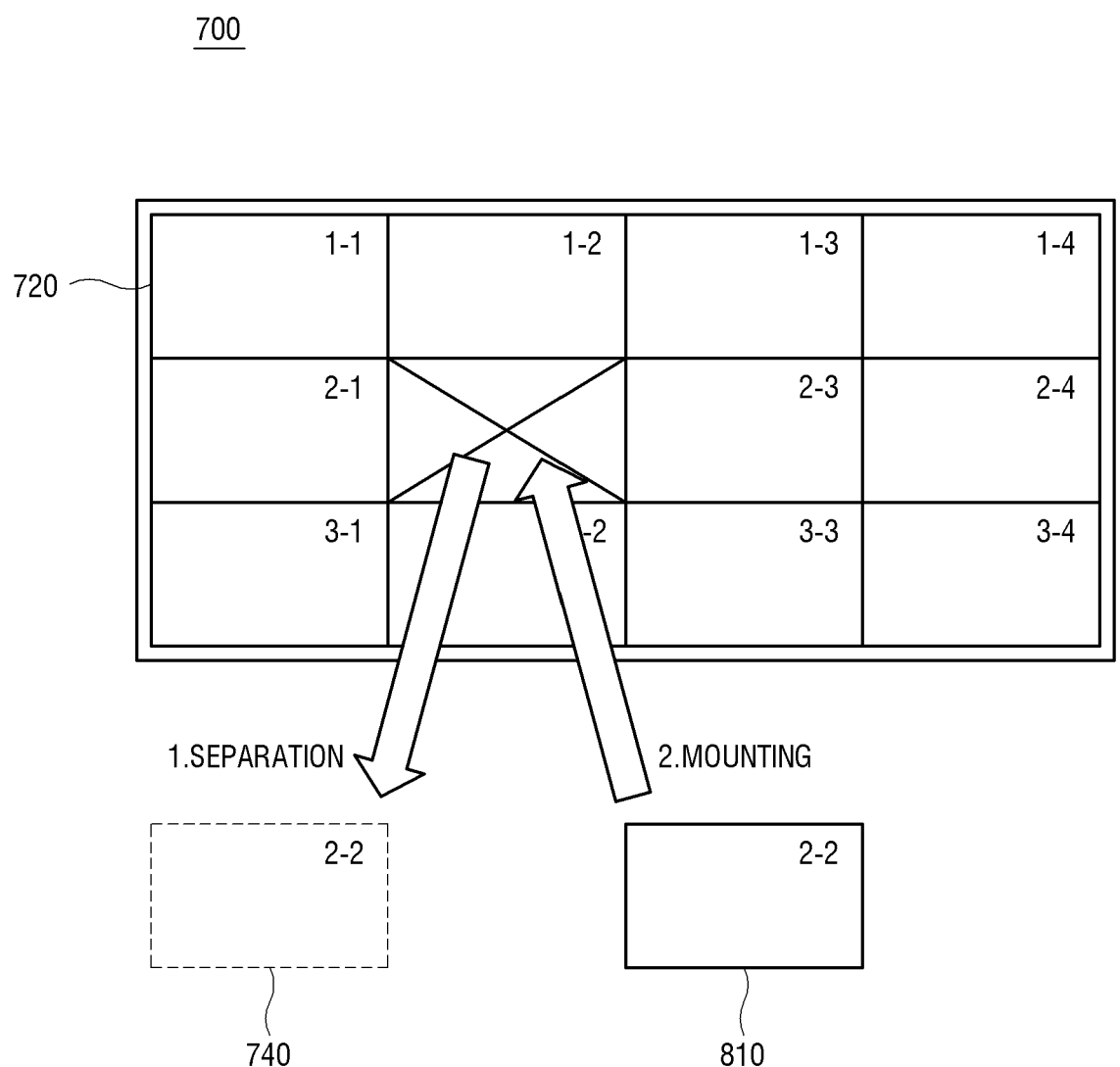
FIG. 8 illustrates replacement of a display module in a display device according to an embodiment.

FIG. 8 illustrates replacement of a display module in a display device according to an embodiment.

As shown in FIG. 8, display module 740 may be removed from the display device 700. For example, the display module 740 may have been damaged and be out of order. Because the display device 700 is formed by the combination of the plurality of display modules 720, it is possible to replace only the display module 740, which is out of order, with a new display module 810 without replacing each of the plurality of display modules 720.

However, when the newly mounted display module 810 is provided with the other display modules 720 to form the screen, the screen of the display device 700 may not be uniform, and the screen of the display device may not have uniform image quality. To make the image quality uniform, the display module 810 obtains the first image-quality set value based on the relative position where the display module 810 is positioned from the image processing device or other display modules 720 when it is identified that the display module 810 is mounted.

As described above, the first image-quality set value is prepared by reflecting the image quality characteristics of the display apparatus in the manufacturing stage. However, a point in time when the display module 810 is newly mounted is after a period of time has passed after the manufacturing stage of the display device 700, and therefore the first image-quality set value may not properly reflect the image quality characteristics of the display apparatus in the current point in time. In other words, when only the first image-quality set value is reflected in the display module 810, the display module 810 may cause the image quality to be not uniform throughout the screen of the display device 700.

In this regard, the display module 810 obtains the image-quality characteristic information about the image quality characteristics of the display device 700 at a current point in time. The image-quality characteristic information may for example include a usage time of the display device 700. The display module 810 obtains the second image-quality set value corresponding to the obtained image-quality characteristic information. For example, regarding the brightness among the image quality characteristics, the second image-quality set value may include an adjustment value or an offset value for an electric current quantity applied from the driver to the light emitting element, based on the usage time of the display apparatus.

The display module 810 controls image characteristics based on the first image-quality set value and the second image-quality set value. For example, the display module 810 reflects the first image-quality set value and the second image-quality set value with respect to an initial value of a driving signal for displaying an image based on an image signal received from the image processing device. By adjusting the initial value of the driving signal, the display module 810 adjusts the initial value and drives the light emitting element based on the adjusted initial value.

The first image-quality set value or the second image-quality set value may refer to a level of image quality for a target image, or may refer to an adjustment value for a driving signal to achieve the level. For example, regarding the brightness among the image quality characteristics, the level of the image quality for the target image may refer to a brightness level, and the adjustment value for the driving signal to reach the level may refer to an electric current quantity of the driving signal for the light emitting element to achieve the brightness level.

Below, it will be described that the display module displays an image by controlling the image quality of the image based on the first image-quality set value and the second image-quality set value.

Figure 9:
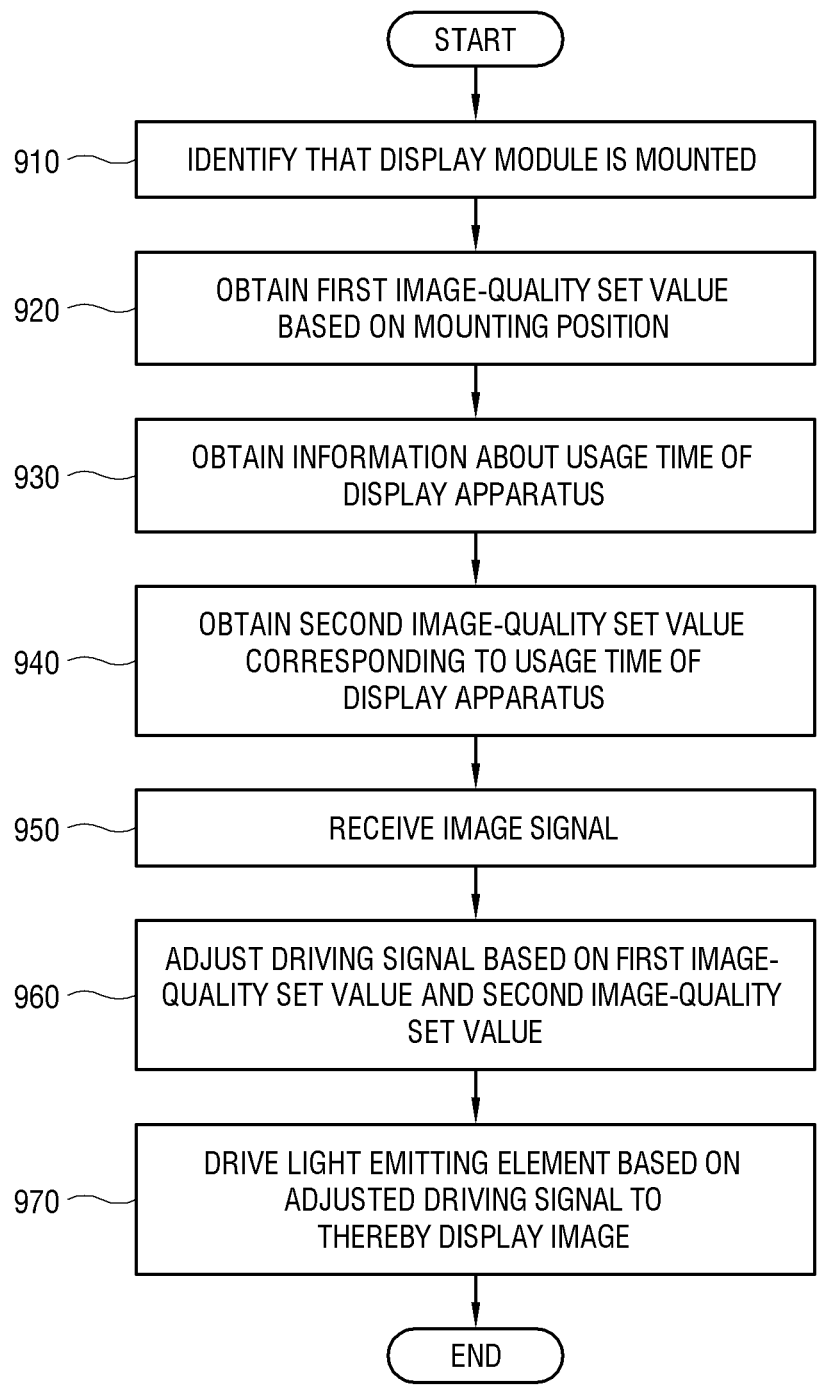
FIG. 9 is a flowchart showing a method by which a display module displays an image with image quality controlled based on a first image-quality set value and a second image-quality set value according to an embodiment.

FIG. 9 is a flowchart showing a method by which a display module displays an image with image quality controlled based on a first image-quality set value and a second image-quality set value according to an embodiment.

The following operations are performed by the module processor of the display module.

At operation 910 the display module identifies that the display module is mounted to the display device.

At operation 920 the display module obtains a first image-quality set value based on a mounting position.

At operation 930 the display module obtains information about usage time of the display apparatus.

At operation 940 the display module obtains a second image-quality set value corresponding to the usage time of the display apparatus.

At operation 950 the display module receives an image signal.

At operation 960 the display module adjusts a driving signal based on the first image-quality set value and the second image-quality set value to thereby control image quality of an image based on the first image-quality set value and the second image-quality set value.

At operation 970 the display module drives the light emitting element with the adjusted driving signal, thereby displaying an image.

In this embodiment, the display module employs both the first image-quality set value and the second image-quality set value to control the image quality of the image. However, embodiments are not limited thereto.

For example, the display module may use only the first image-quality set value without the second image-quality set value to control the image quality of the image. For example, when the usage time of the display apparatus is not relatively long, the light emitting elements of the existing display modules may not be significantly deteriorated. In this regard, when the usage time of the display apparatus does not exceed a predetermined threshold, in other words, when the usage time of the display apparatus is relatively short, the display module may employ only the first image-quality set value.

Alternatively, the display module may use only the second image-quality set value without the first image-quality set value to control the image quality of the image. For example, when it is regarded that difference in initial image quality is not significant between a new display module for replacement and the existing display modules because they have been used for a similar period of time, the first image-quality set value may not be employed. The standards for not using the first image-quality set value may be variously provided, for example, when the display modules are of the same model by the same manufacturer, when the display modules are produced at the same period of time, when the display modules belong in common to a previously set product category, etc.

There may be many examples of the image-quality set value corresponding to the image-quality characteristic information of the display apparatus. Below, a method of obtaining the image-quality set value corresponding to the image-quality characteristic information will be described below.

Figure 10:
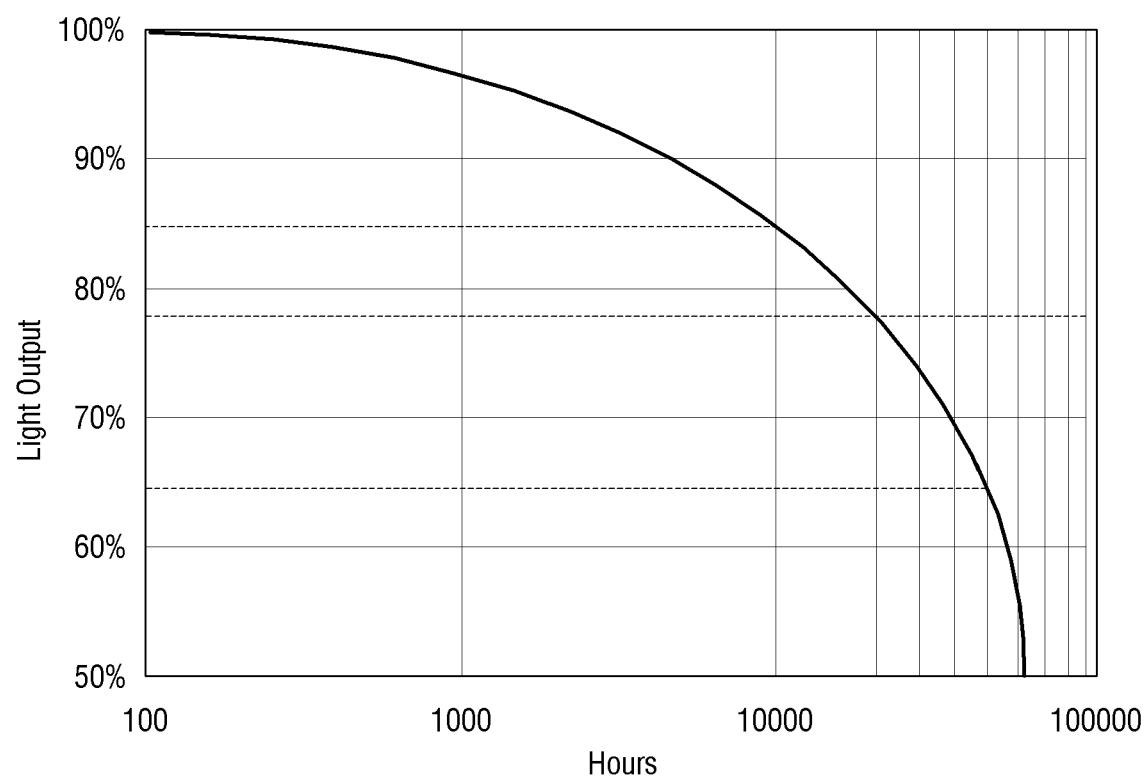
FIG. 10 is a graph showing a relationship between the brightness and life of a light emitting diode (LED) according to an embodiment.

FIG. 10 is a graph showing a relationship between the brightness and life of an LED according to an embodiment.

As shown in FIG. 10, brightness of the LED is lowered as usage time increases. This graph is based on experiments on a predetermined LED, in which the ordinates indicate the maximum brightness representable by the LED and the abscissa indicate the usage time of the LED. For example, when the usage time of the LED is 10,000 hours, the maximum brightness level representable by the LED is lowered to 85% of the maximum brightness. When the usage time of the LED is 20,000 hours, the maximum brightness level representable by the LED is lowered to 78% of the maximum brightness. When the usage time of the LED increases up to 50,000 hours, the maximum brightness level representable by the LED is further lowered to 64% of the maximum brightness.

In other words, the maximum brightness level representable by the LED is gradually lowered because the deterioration of the LED accumulates as the usage time of the LED increases.

In this regard, the following design may be applied to the display module in connection with the brightness of the LED. The image-quality characteristic information includes information about the usage time of the display apparatus, and the image-quality set value includes the brightness of the LED. The display module may obtain a table in which brightness control values for the LED are tabulated corresponding to the usage time. In this table, electric current quantities of a driving signal for the LED, adjusted to lower the brightness of the LED, may for example be tabulated corresponding to the usage time of the display apparatus.

When the display module is mounted to the display apparatus, the display module identifies the usage time of the display apparatus. The display module identifies the brightness control value corresponding to the identified usage time of the display apparatus from the table, and controls the driving signal for the LED based on the identified brightness control value.

The foregoing embodiment may be applicable to the following example. While the display apparatus is being used after initial installation, the LEDs are deteriorated in the plurality of display modules and thus the upper limit of the representable brightness is gradually lowered. In this state, when a certain display module is replaced, the replaced display module is new and thus the upper limit of the brightness representable by the LED is relatively high. Therefore, when an image is displayed on the screen of the display apparatus without any compensation, the brightness in the area corresponding to the replaced display module is higher than the brightness in the areas corresponding to the other display modules.

Accordingly, the usage time of the display apparatus is taken into account, as discussed above, so that the brightness in the replaced display module can be lowered to correspond with those of the other display modules. Thus, the brightness is uniform throughout the screen of the display apparatus even though the display module is newly replaced.

In this embodiment, the image-quality characteristic information includes the usage time of the display apparatus, and the image-quality set value includes the brightness of the LED. However, such parameters included in the image-quality characteristic information and the image-quality set value are not limited thereto, and various parameters may be included in the image-quality characteristic information or the image-quality set value.

For example, the image-quality characteristic information may include information about the manufacturer and the model of the display apparatus. The display apparatuses may have variations in processing an image signal according to their manufacturers or models, and thus display an image with different image quality. The display module may adjust a driving signal for an LED to form a screen, in which image quality is uniform, based on the image-quality set value corresponding to information about the manufacturer and model of the display apparatus.

The image-quality set value is provided to adjust various parameters such as contrast, saturation, a gamma value, etc. as well as the brightness of an image. The image-quality set value may include a value for adjusting a level of image quality of an image, or a value for adjusting a driving signal for an LED to adjust the image quality of the image.

Meanwhile, the foregoing embodiment describes that the display module obtains the image-quality characteristic information of the display apparatus from the image processing device. However, embodiments are not limited thereto and the image-quality characteristic information may be provided from sources other than the image processing device. For example, the image-quality characteristic information may be obtained from various routes, and such an embodiment will be described below.

Figure 11:
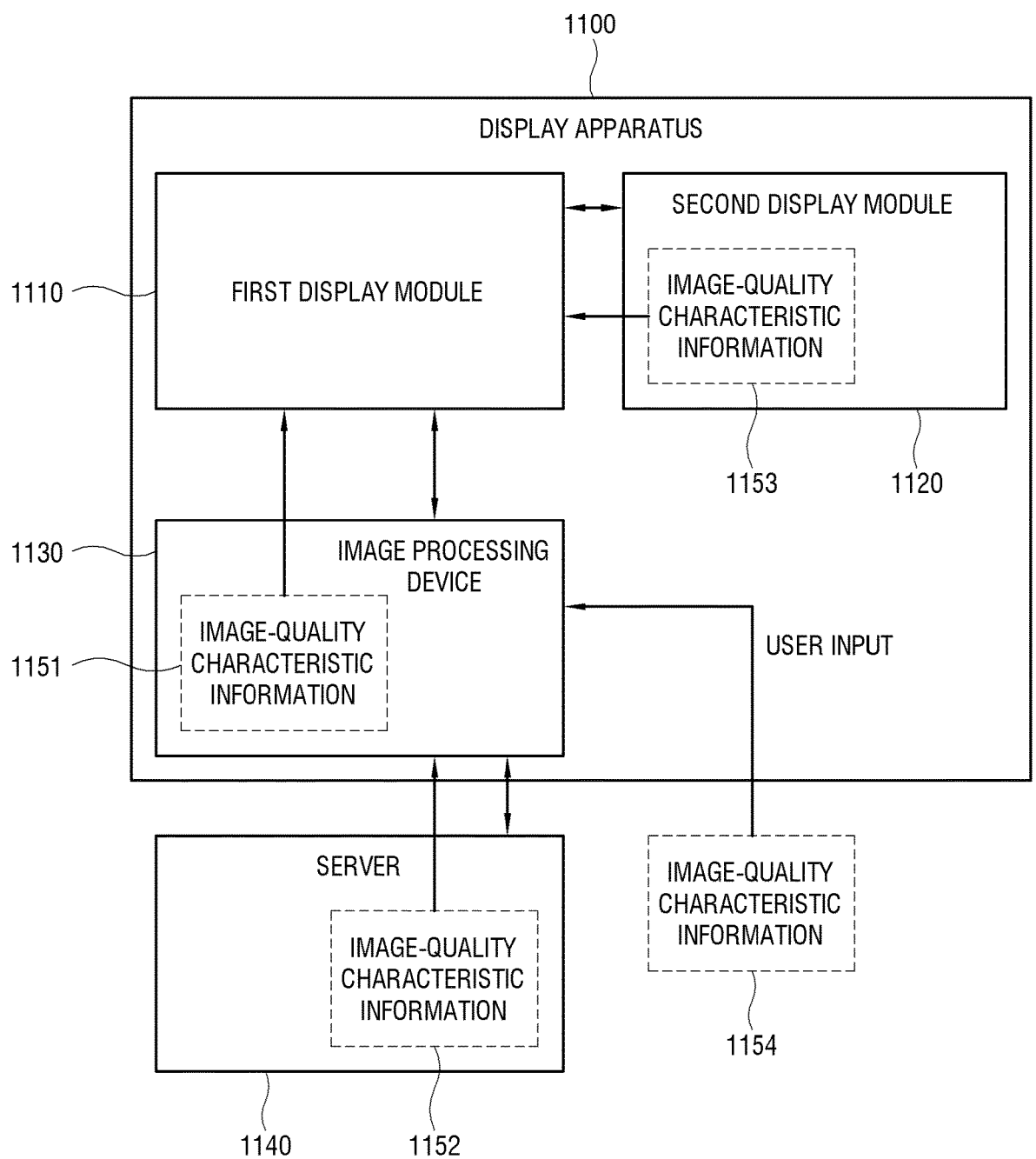
FIG. 11 is a block diagram showing a route from which a display module obtains image-quality characteristic information according to an embodiment.

FIG. 11 is a block diagram showing a route from which a display module obtains image-quality characteristic information according to an embodiment.

As shown in FIG. 11, a display apparatus 1100 includes an image processing device 1130 and a plurality of display modules 1110 and 1120. The image processing device 1130 is configured to output an image signal to the plurality of display modules 1110 and 1120, and communicate with the plurality of display modules 1110 and 1120. Each of the plurality of display modules 1110 and 1120 drives a plurality of LEDs to individually emit light so that an image can be displayed based on an image signal received from the image processing device 1130. In this case, a first display module 1110 which is newly mounted obtains the image-quality characteristic information of the display apparatus 1100, and adjusts a driving signal for the LED based on the obtained image-quality characteristic information.

There may be many routes from which the first display module 1110 can obtain the image-quality characteristic information. For example, when it is identified that the first display module 1110 is mounted, the first display module 1110 may obtain image-quality characteristic information 1151, which is stored in the image processing device 1130, from the image processing device 1130.

Alternatively, when it is identified that the first display module 1110 is mounted, the image processing device 1130 transmits a request for image-quality characteristic information 1152 to a server 1140. The server 1140 stores the image-quality characteristic information 1152 of the display apparatus 1100, and transmits the image-quality characteristic information 1152 based on position information about the replaced first display module 1110 to the image processing device 1130 in response to the request of the image processing device 1130. Here, the position information is the same as described in the foregoing embodiment. The image processing device 1130 provides the image-quality characteristic information 1152 received from the server 1140 to the first display module 1110.

Alternatively, the newly mounted first display module 1110 may obtain image-quality characteristic information 1153 from a second display module 1120 that has already been mounted and is in use.

Alternatively, the image processing device 1130 may receive a user input, and provide image-quality characteristic information 1154 based on the received user input to the first display module 1110.

The foregoing embodiments describe that the mounted display module obtains the image-quality set value based on the image-quality characteristic information of the display apparatus, and displays an image with image quality controlled based on the obtained image-quality set value. However, these operations may be performed not only by the mounted display module but the image processing device, and such an embodiment will be described below.

Figure 12:
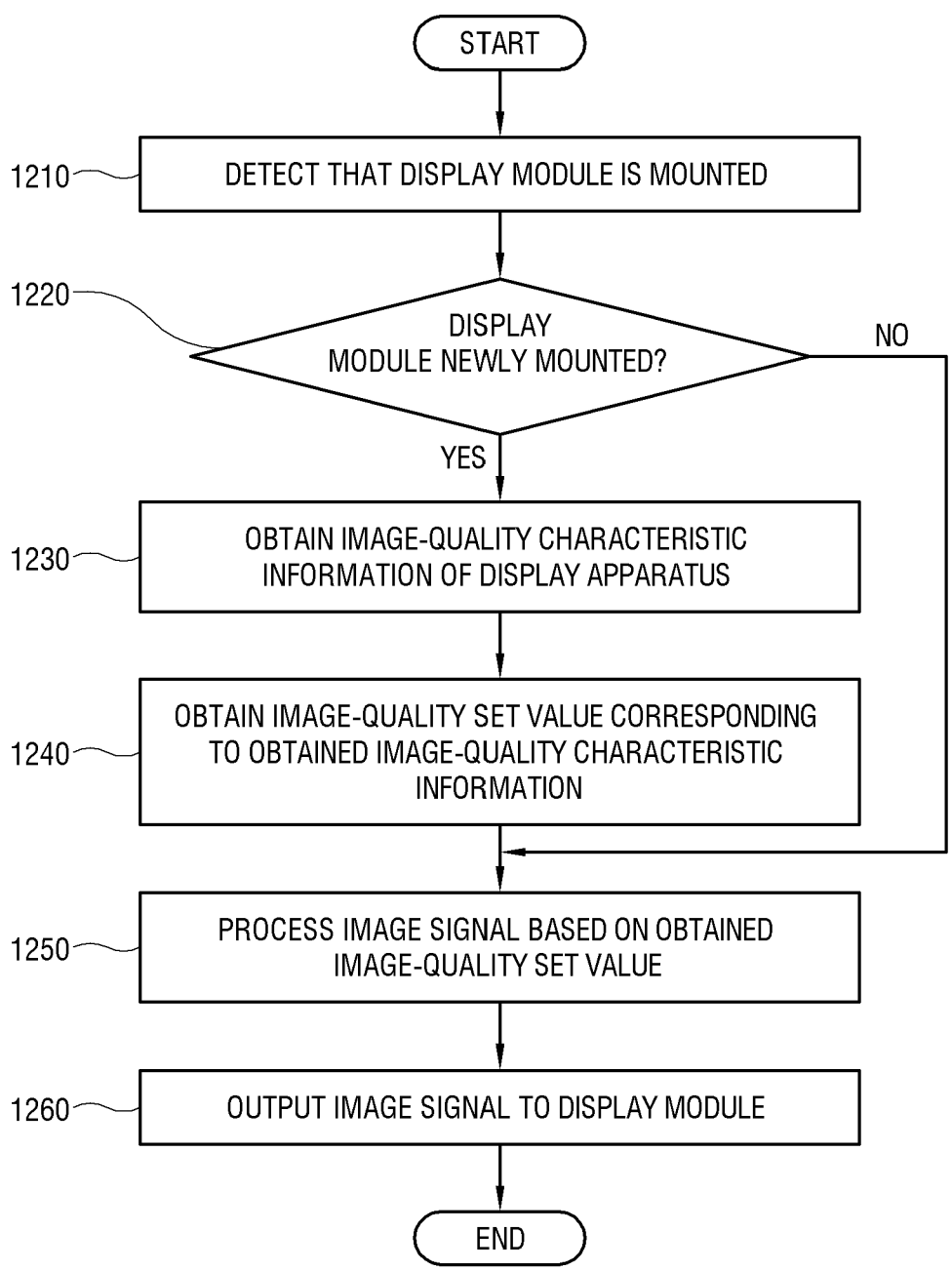
FIG. 12 is a flowchart showing a method by which a display apparatus controls an image processing device according to an embodiment.

FIG. 12 is a flowchart showing a method by which a display apparatus controls an image processing device according to an embodiment.

The following operations are performed by a main processor of the image processing device.

At operation 1210 the image processing device detects that a display module is mounted.

At operation 1220 the image processing device identifies whether a display module is newly mounted. As one example of identification methods, the image processing device obtains identification information of the mounted display module from the corresponding display module, and identifies whether the obtained identification information is from a previously registered display module (in other words, whether the obtained identification information corresponds to or is the same as identification information of the display module that has previously been in use). The image processing device may identify the mounted display module as a previously used display module when the obtained identification information has been already registered, and identify the mounted display module as a new display module when the obtained identification information has not been already registered. However, this is merely an example, and various identification methods may be provided and used.

When it is identified that the display module is newly mounted, at operation 1230 the image processing device obtains the image-quality characteristic information about the display apparatus. On the other hand, when it is identified that the display module is not newly mounted, the image processing device directly enters operation 1250. For example, the display module that is not newly mounted may process an image signal based on a previously obtained image-quality set value in operation 1250.

At operation 1240 the image processing device obtains an image-quality set value about the display module, corresponding to the obtained image-quality characteristic information.

At operation 1250 the image processing device processes an image signal based on the obtained image-quality set value. For example, when the image-quality set value is related to the brightness of an image, the image processing device may reflect the image-quality set value in a brightness level of the image signal to be output to the display module, thereby adjusting the brightness level of the image signal.

At operation 1260 the image processing device outputs the image signal to the display module.

In other words, in terms of outputting the image signal to the display module, the image processing device reflects typical image-processing in the image signal and outputs the image signal to the display module when it is identified that the display module has been previously used. On the other hand, when it is identified that the display module is newly mounted, the image processing device processes the image signal by reflecting an image-quality set value corresponding to the image-quality characteristic information of the display apparatus in addition to the typical image-processing in the image signal.

The image signal provided to the display module is adjusted by the image processing device, and therefore the display module does not perform operation of adjusting the driving signal based on the image-quality set value. Regardless of whether the display module is newly mounted or not, the display module typically performs operation of generating the driving signal based on the image signal received from the image processing device.

It is described that the image processing device obtains the image-quality characteristic information about the display apparatus and the image-quality set value corresponding to the image-quality characteristic information, processes the image signal based on the obtained image-quality set value, and outputs the processed image signal to the display module. However, embodiments are not limited thereto and according to an another embodiment, the image-quality set value obtained by the image processing device may be transmitted to the display module.

In this case, the image processing device does not process the image signal based on the obtained image-quality set value, but applies only typical image-processing to the image signal, thereby transmitting the processed image signal to the display module. The display module processes the image signal received from the image processing device, based on the image-quality set value obtained from the image processing device, and displays an image based on the processed image signal.

The processor of the image processing device or the module processor of the display module may perform at least a part of data analysis, data process and result information generation based on at least one of machine learning, neural network, deep learning algorithms as a rule-based or artificial intelligence (AI) algorithm in order to perform operations of adjusting the image signal or the driving signal for the LED based on the image-quality characteristic information about the display apparatus as described above.

For example, the processor of the image processing device or display module may function as a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data (i.e., training data) and generate the neural network based on the obtained learning data. For example, the learner may obtain the learning data from the storage of the display module or from the outside. The learning data may be data used for learning the neural network, and the data subjected to the foregoing operations may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network set to perform the operations.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

The recognizer may obtain target data to carry out the foregoing operations. The target data may be obtained from the storage of the image processing device, the module storage of the display module, or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

The operations of the apparatus described in the foregoing embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be non-transitory. For example, the computer readable medium may be stored in a nonvolatile storage such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program instruction recorded in this storage medium may be specially designed and configured according to the embodiments, or may be publicly known and available to those skilled in the art of computer software. Further, the computer program instruction may be implemented by a computer program product.

Although embodiments have been shown and described, it will be appreciated by those skilled in the art that changes may be made to these embodiments without departing from the principles and spirit of the disclosure, the scope of which is defined in the appended claims and their equivalents.

What is claimed is:

1. A display apparatus comprising:
a display device comprising a plurality of display modules arranged to form a screen; and
an image processing device configured to output a signal to the display device to control display of an image on the screen,
wherein one of the plurality of display modules comprises:
a substrate,
a plurality of light emitting diodes (LEDs) arranged on the substrate,
a driver configured to output a driving signal to control the plurality of LEDs to emit light,
a storage configured to store an image-quality set value, and
a processor configured to obtain a first image-quality set value based on a position of the one of the plurality of display modules in the display device and a second image-quality set value based on a usage time of a different display module among the plurality of display modules, and control the driver to adjust the driving signal based on the first image-quality set value and the second image-quality set value.

2. The display apparatus according to claim 1, wherein the processor is further configured to control the driver to adjust an electric current of the driving signal based on the first image-quality set value and the second image-quality set value.

3. The display apparatus according to claim 2, wherein the image-quality set value indicates an adjustment value for the electric current of the driving signal corresponding to image-quality characteristic information of the one of the plurality of display modules, and
wherein the processor is further configured to control the driver to adjust the electric current of the driving signal based on the adjustment value which has been updated based on the image-quality characteristic information.

4. The display apparatus according to claim 1, wherein the processor is further configured to obtain the usage time of the different display module from the image processing device.

5. The display apparatus according to claim 1, wherein the processor is further configured to obtain second image-quality characteristic information from the different display module and obtain the second image-quality set value based on the second image-quality characteristic information.

6. The display apparatus according to claim 1, wherein the processor is further configured to obtain the usage time based on a user input.

7. The display apparatus according to claim 1, further comprising a communication interface,
wherein the processor is further configured to obtain the usage time from a server through the communication interface.

8. The display apparatus according to claim 1, wherein each of the plurality of display modules is replaceable.

9. A display module configured to be used in a display apparatus comprising a plurality of replaceable display modules, the display module comprising:
a substrate;
a plurality of light emitting diodes (LEDs) arranged on the substrate;
a driver configured to output a driving signal for driving the plurality of LEDs to emit light;
a storage configured to store an image-quality set value; and
a processor configured to obtain a first image-quality set value based on a position of the display module in the display apparatus and a second image-quality set value based on a usage time of a different display module among the plurality of replaceable display modules, and control the driver to adjust the driving signal based on the first image-quality set value and the second image-quality set value.

10. A method of controlling a display module of a display apparatus that includes a display device with a plurality of display modules arranged to form a screen, and an image processing device configured to output a signal to the display device to control display of an image on the screen, the method comprising:

storing an image-quality set value for driving a plurality of light emitting diodes (LEDs) arranged on a substrate of the display module;

obtaining a usage time of a different display module among the plurality of display modules;

obtaining a first image-quality set value based on a position of the display module in the display device and a second image-quality set value based on the obtained usage time;

adjusting a driving signal for driving the plurality of LEDs to emit light based on the first image-quality set value and the second image-quality set value; and controlling the plurality of LEDs based on the adjusted driving signal.

11. The method according to claim 10, further comprising adjusting an electric current of the driving signal based on the first image-quality set value and the second image-quality set value.

12. The method according to claim 11, wherein the stored image-quality set value indicates an adjustment value for the electric current of the driving signal corresponding to image quality characteristics of the display module, and wherein the method further comprises adjusting the electric current of the driving signal based on the adjustment value which has been updated based on the image-quality characteristic information.

13. The method according to claim 10, further comprising obtaining the usage time of the different display module from the image processing device.

14. The method according to claim 10, further comprising obtaining the usage time from the different display module.

15. The method according to claim 10, further comprising obtaining the usage time based on a user input.

16. The method according to claim 10, further comprising obtaining the usage time from a server communicating with the display apparatus.

17. The method according to claim 10, wherein each of the plurality of display modules is replaceable.

* * * * *